United States Patent [19]

Schumann et al.

[11] Patent Number: 5,744,572
[45] Date of Patent: Apr. 28, 1998

[54] PROCESS FOR THE ACCELERATION OF THE POLYCONDENSATION OF POLYESTER

[75] Inventors: Heinz-Dieter Schumann, Maintal; Ulrich Thiele, Bruchkoebel, both of Germany

[73] Assignee: Zimmer AG, Frankfurt, Germany

[21] Appl. No.: 797,461

[22] Filed: Feb. 6, 1997

[30] Foreign Application Priority Data

Aug. 1, 1996 [DE] Germany ............... 196 31 068.7

[51] Int. Cl.⁶ ...................... C08G 63/78
[52] U.S. Cl. ............ 528/286; 528/287; 528/298; 528/302; 528/307; 528/308; 528/308.6; 528/481; 528/503; 428/35.7
[58] Field of Search ............... 528/286, 287, 528/298, 302, 307, 308, 308.6, 481, 503; 428/35.7

[56] References Cited

U.S. PATENT DOCUMENTS 3,169,944  2/1965  Scott et al. .............. 528/167
4,086,208  4/1978  Murayama et al. .............. 528/167

Primary Examiner—Samuel A. Acquah
Attorney, Agent, or Firm—McDonnell Boehnen Hulbert & Berghoff

[57] ABSTRACT

A process for the acceleration of the polycondensation of polyester made by the esterification of at least one dicarboxylic acid with at least one diol, precondensation, melt phase polycondensation, granulation, crystallization and solid phase polycondensation comprising the addition, prior to the precondensation reaction, of from about 30 to about 900 ppm phosphorus in relation to the polyester in the form of carboxy phosphonic acid of the formula:

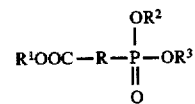

wherein, R is selected from the group consisting of $C_{1-10}$-alkylene, $C_{1-10}$-cycloalkylene, and $C_{6-10}$-arylene and $R^1$, $R^2$, and $R^3$ are selected from the group consisting of hydrogen, $C_{1-10}$-alkyl, $C_{1-10}$-cycloalkyl, and $C_{6-10}$-aryl, provided that at least two of $R^1$, $R^2$, and $R^3$ are hydrogen.

7 Claims, No Drawings

PROCESS FOR THE ACCELERATION OF THE POLYCONDENSATION OF POLYESTER

BACKGROUND OF THE INVENTION

1. Field of the Invention

The present invention relates to a process for the acceleration of the polycondensation of polyesters, particularly of the solid phase polycondensation of polyester through modification of the polyester.

2. Summary of the Related Art

Polyester is produced through esterification or reesterification and subsequent melt polycondensation. The speed of the melt polycondensation reaction is influenced by catalysts, such as antimony, titanium or germanium compounds, and by the diffusion speed of glycol, which is cleaved during the reaction. This diffusion speed is, in part, determined by the pressure applied and the circulation of the polycondensation melt (U.S. Pat. No. 3,499,873).

To produce polyesters used in a number of applications, such as beverage bottles and technical threads, crystallization and solid phase polycondensation reactions are also required (U.S. Pat. Nos. 4,064,112; 4,263,425; and 5,362,844). These reactions take place in the presence of a gas which is inert with respect to the polyester.

The reaction velocity of solid phase condensation is influenced by the reaction temperature, the average diffusion length in the polyester granulate grain, the speed of the gas and the concentration of catalyst and stabilizer. In general, antimony, germanium and titanium catalysts accelerate the condensation reaction, whereas phosphorus compounds, such as $H_3PO_4$ and $H_3PO_3$, inhibit the reaction by forming inactive complexes with these catalysts. In order to increase the viscosity of polyethyleneterephthalate (PET) and low modified PET from approximately 0.6 dl/g to 0.8 dl/g, approximately 1 to 2 hours of crystallization and 10 to 15 hours of solid phase polycondensation, at approximately 180° to 210° C., are necessary.

European patent EP 0422282 and PCT applications WO 92/17519, WO 92/17522 and WO 93/08226 describe the increased acceleration of solid phase polycondensation by the addition of 0.1 to 1 weight % tetracarboxylic acid dianhydride (particularly pyromellitic acid dianhydride) when mixed into the polyester melt after melt polycondensation. This method, however, causes undesirable cross-linking in the polyester because of the four reactive groups of the dianhydride and the relatively high amount of dianhydride required. Furthermore, these dianhydrides are toxic and their homogenous mixing into the viscous polyester melt requires considerable technical expertise.

In the production of polyester, carboxy phosphonic acid compounds of the formula:

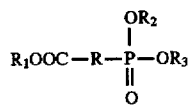

can be added to the reaction mixture after the reesterification process and before the polycondensation to inactivate the catalyst by forming a complex with the reesterification catalyst. $R^1$, $R^2$, $R^3$ are alkyl groups (U.S. Pat. No. 4,254,018; EP 0699700 A; JP 49-125 494 A) or —H or alkyl (U.S. Pat. No. 3,169,944). The addition of 500 to 50,000 ppm of phosphorus as a compound of the above formula (in which $R^1$, $R^2$ and $R^3$ are the same hydrocarbon radical or —H) at the beginning of the esterification or reesterification reaction, followed by polycondensation and spinning and stretching produces polyester fibers with improved flame resistance (U.S. Pat. No. 4,086,208). None of the aforementioned references describes an increased polycondensation rate or solid phase polycondensation rate of polyesters in the presence of carboxy phosphonic acid.

SUMMARY OF THE INVENTION

The present invention comprises a method to accelerate the rate of the melt polycondensation reaction in the production of polyester. In particular, the present invention is a method for increasing the rate of solid phase polycondensation in the production of polyester, while retaining the desired properties of the polyester.

In the present invention polyester is produced by the esterification of at least one dicarboxylic acid with at least one diol. Esterification is followed by precondensation, and melt phase polycondensation, in the presence of known catalysts and conventional additives, granulation, crystallization and solid phase polycondensation. In the present invention polycondensation of the polyester, particularly of the solid phase polycondensation is accelerated by the addition of one or more carboxy phosphonic acid compounds of the formula:

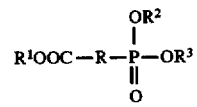

to the esterification mixture prior to precondensation. Two of the groups $R^1$, $R^2$ and $R^3$ are —H and the third group is —H or $C_{1-10}$-alkyl, $C_{1-10}$-cycloalkyl or $C_{6-10}$-aryl, and R is $C_{1-10}$-alkylene, $C_{1-10}$-cycloalkylene or $C_{6-10}$-arylene. Compounds of the above formula are added in a quantity corresponding to 30 to 900 ppm, preferably 60 to 500 ppm phosphorus, in relation to the polyester.

The accelerating effect of the carboxy phosphonic acid compound on the polycondensation of polyesters was unexpected and not disclosed in the prior art. Polyesters of identical viscosity can be obtained by traditional methods as well as the method of the present invention. However, polyester made in the presence of the carboxy phosphoric acid through melt polycondensation requires a residence time of up to approximately 10% shorter, or a temperature up to 3° C. lower than polyester made by traditional methods. Similarly, polyesters made by solid phase polycondensation employing a carboxy phosphonic acid compound require a residence time up to approximately 30% shorter or a temperature up to 20° C. lower than those employing traditional methods.

The acceleration of the polycondensation reaction in the production of polyester by the addition of carboxy phosphonic acid compounds has not been disclosed in the prior art. Rather U.S. Pat. Nos. 4,086,208 and 3,169,944 indicate that addition of carboxy phosphonic acid compounds has a retarding effect on the reesterification process. The accelerating effect of carboxy phosphonic acid compounds observed in the process of the present invention may be due to the presence of at least two free acid groups on the carboxy phosphonic acid compounds and to the restriction of its addition to polyester production by the direct esterification process. Prior art references previously cited disclose fully-esterified carboxy phosphonic acid compounds without free acid groups and/or for use in the reesterification process.

U.S. Pat. No. 3,169,944 discloses the sole example the addition of a non-esterified carboxy phosphonic acid to the polyester reaction mixture. In this example the non-esterified carboxy phosphonic acid was added after the reesterification reaction to deactivate the reesterification catalyst.

Polyesters obtained in accordance with the process of the present invention are characterized by high brilliance and slight turbidity. Surprisingly, the turbidity values of polyesters produced by the method of the present invention (measured in nephelometric turbidity units) decreases during solid phase polycondensation, while they remain constant with polyesters produced by conventional methods. The polyesters produced in accordance with the method of the present invention are particularly well suited for the production of beverage bottles and transparent packagings.

Polyester may be produced either continuously or discontinuously, through the direct esterification of terephthalic acid or 2,6-naphthalene dicarboxylic acid with ethylene glycol followed by precondensation and melt polycondensation. In the present invention, one or more carboxy phosphonic acid compounds are added to the reaction mixture prior to precondensation at the beginning of or during the esterification. Preferably the carboxy phosphonic acid is added when approximately 50 to 80% of the carboxyl groups of the polyester-forming dicarboxylic acid(s) have been esterified. The yield or degree of esterification (U) can thereby be computed from the saponification number ($V_Z$) and the acid number ($S_Z$) of the reaction mixtures in accordance with the formula $U=(V_Z-S_Z)\times 100/V_Z$. The saponification number is determined by means of saponification with potassium hydroxide in n-propanol and potentiometric titration. The acid number is determined by potentiometric titration in dimethyl formamide.

Dicarboxylic acid and/or ethylene glycol can be partially replaced by other dicarboxylic acids and/or diols, such as isophthalic acid, terephthalic acid, 1,4-cyclohexanedicarboxylic acid, 2,6-naphthalene dicarboxylic acid, p-hydroxy benzoic acid, 4,4'-biphenyldicarboxylic acid, adipic acid, diethylene glycol, 1,4-butanediol, 1,4-cyclohexane dimethanol, and polyglycol with a molecular weight under 1000. The portion of these co-monomers should not exceed approximately 10 weight % in the polyester, otherwise the mechanical and thermal characteristics of the polyester produced would be impaired relative to polyethylene terephthalate or -naphthalate. The preferred polyester produced by the method of the present invention and is a polyethylene terephthalate containing 0.8 to 2.0 weight % of diethylene glycol (formed by the reaction or added if required), about 1.0 to about 5.0 weight % of a co-monomer selected from the group consisting of isophthalic acid, 2,6-naphthalene dicarboxylic acid, p-hydroxy benzoic acid and 1,4-cyclohexane dimethanol, and about 0 to about 1000 ppm pentaerythrite, all values in relation to the polyester. The condensation reaction is performed in the presence of conventional catalysts, such as antimony-, titanium- and/or germanium compounds. Tri- or tetra-functional alcohols, carboxylic acids or hydroxy carboxylic acids can be added in small quantities (up to a maximum of 1000 ppm) to the reaction mixture, preferably during the esterification. Also, cobalt salts, as blue toners, coloring agents, pigments (titanium dioxide), and conventional stabilizers, such as phosphorous acid, phosphoric acid or their esters, can be added in the usual manner. Normally, stabilizers are not needed since the carboxy phosphonic acid compounds have a stabilizing effect.

After melt polycondensation, the polyester is granulated in a conventional fashion and the granulate crystallized at approximately 140° to 230° C. with polyethylene terephthalate or up to approximately 265° C. with polyethylene napthalate. The crystallized material is then subjected to solid phase polycondensation at 170° to 230° C. (preferably 180° to 210° C.) with polyethylene terephthalate, or up to approximately 265° C. with polyethylene naphthalate in an inert atmosphere.

By adding the carboxy phosphonic acid compound to the polyester synthesis mixture at an early stage of the synsthesis, complete incorporation of the carboxy phosphonic acid compound into the polyester molecule accompanied by formation of long-chain branchings is guaranteed. Furthermore, incorporation of the carboxy phosphonic acid compound into the polymer molecule leads to a permanent thermal and thermo-oxidative stabilization of the polyester.

In the method of the present invention the carboxy phosphonic acid compound is preferably used as the free acid:

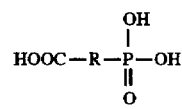

wherein R is a $C_{1-10}$-alkylene (preferably ethylene), $C_{1-10}$-cycloalkylene or $C_{6-10}$-arylene-group. One of the three acid groups can also be present as $C_{1-10}$-alkyl- (preferably ethyl-), $C_{1-10}$-cycloalkyl- or $C_{6-10}$-aryl-ester group. The esterified group can be both the carboxyl group, as well as one of the acid groups of the phosphonic acid. In this case, the co-polymerization and long-chain branching is accomplished both by esterification, as well as by reesterification. Since the esterification proceeds more easily than the non-catalyzed reesterification, a certain amount of control over the type of branching is possible.

In the method of the present invention the quantity of carboxy phosphonic acid compound used in the reaction is from about 30 to about 900 ppm, preferably from about 60 to about 500 ppm phosphorus, in relation to the polyester. The precise quantity depends somewhat on the co-monomer and the final use of the polyester. For polyesters with at least 95 weight % ethylene terephthalate units, from about 100 to about 400 ppm phosphorus are preferred. Reducing the phosphorus reduces the accelerating effect on polycondensation, whereas increasing the phosphorus increases long-chain branching impairing the processability of the polyester. Since the carboxy phosphonic acid compounds used in polyester synthesis are neither volatile, nor form volatile compounds, the metering of the carboxy phosphonic acid compounds can be carried out without consideration of possible losses. Also, if the non-purified split glycol is recycled during the polyester production process, no disturbances of the polyester process arise through carboxy phosphonic acid compounds entrained within the split glycol.

The invention will be illustrated in further detail in the following by means of examples.

EXAMPLES

The following examples illustrate preferred embodiments of this invention as well as preferred methods for using compositions of this invention. In the following examples the parameters reported were measured as described below.

The intrinsic viscosity (I.V.) was measured at 25° C. in a solution of 500 mg polyester in 100 ml of a mixture of phenol and 1,2-dichlorobenzene (3:2 weight parts).

The diethylene glycol (DEG) contained in the polyester was determined by gas chromatographic means in the reesterification mixture of 1 g polyester with 30 ml methanol and 50 mg/l of zinc acetate obtained in the Carius tube at 200° C.

The determination of the turbidity degree in "nephelometric turbidity units" (NTU) was performed on a 10 weight % solution of polyester in phenol/1,2-dichlorobenzene (3:2 weight parts) placed in a cuvette with 22.2 mm diameter (standard norm, conventional for water, number DIN 38 404, Part 2) using a Hach nephelometer (Type XR, U.S. Pat. No. 4,198,161). The intensity of the scattered light was blanked against a formazine standard solution (approximately 0.3 NTU).

| Abbreviations used: | |
|---|---|
| IPA | Isophthalic acid |
| NDA | 2,6-naphthalene dicarboxylic acid |
| PHB | p-Hydroxy benzoic acid |
| CHDM | 1,4-dihydroxymethylcyclohexane |
| Penta | Pentaerythrite |
| PMS | Pyromellitic acid |
| PK | Polycondensation | optical brightening agent (Opt), Eastobrite OB-1 (Eastman Chemical Co., Rochester, N.Y.) and phosphoric acid (a stabilizer) were added. Precondensation was accomplished by a gradual reduction of the pressure to 50 mbar (abs.) and a simultaneous increase of the temperature to approximately 275° C. within 30 min. The precondensate was transferred through a 15 μm filter into the polycondensation reactor. The pressure was reduced, within 45 min. to less than 2 mbar (abs.) and the temperature raised to approx. 280° C. within 130 min., during which time the polycondensation reaction was completed. The polyester was then discharged from the polycondensation reactor within 20 min. and granulated (granulate grain weight approximately 17 mg). The granulate was crystallized for 1 hour at 220° C. under dry air and subsequently solid phase polycondensed for 8 hours at 210° C. in a dry nitrogen current (200 Nl/h). The results are summarized in Table 1.

TABLE 1

| Example No | 1 | 2 | 3 | 4 | 5 | 6 |
|---|---|---|---|---|---|---|
| Polyester after melt polycondensation | | | | | | |
| Co-monomer (weight %) | IPA 2.5 | CHDM 2.5 | NDA 2.5 | IPA 1.5 and PHB 2.0 | IPA 2.5 | IPA 2.5 |
| DEG (weight %) | 1.2 | 1.3 | 1.0 | 1.2 | 1.2 | 1.2 |
| Branching agent (ppm) | Penta 100 | PMS 100 | Penta 100 | — | Penta 100 | Penta 100 |
| Catalyst (ppm) | Sb 200 | Sb 180 | Sb 200 | Sb 200 | Ti 25 | Ge 60 |
| $H_3PO_4$ (ppm) | 20 | 15 | 15 | 15 | 20 | 20 |
| CEPS (ppm P) | — | — | — | — | — | — |
| Color toner (ppm) | Co 15 | Est 2 | Opt 10 | — | Co 15 | Co 15 |
| I.V. (dl/g) | 0.60 | 0.60 | 0.56 | 0.56 | 0.60 | 0.61 |
| Turbidity (NTU) | 5 | 4.5 | | | | |
| Polyester after solid phase polycondensation | | | | | | |
| I.V. (dl/g) | 0.80 | 0.75 | 0.73 | 0.67 | 0.66 | 0.73 |
| Δ I.V. per hour | 0.025 | 0.019 | 0.022 | 0.014 | 0.007 | 0.016 |
| Turbidity (NTU) | 6 | 4 | | | | |

Examples 1–6

Terephthalic acid, ethylene glycol, co-monomers and catalyst were homogeneously mixed by agitation, and fed into an esterification reactor, preheated to 265° C., under atmosperic pressure within approximately 140 min. The reactor was filled with approximately 30% pre-condensate of the previous batch. A branching agent was subsequently added and the mixture esterified for 30 min., at 265° C. under atmospheric pressure with separation of the reaction water. Then, cobalt acetate (Co), Estofilblau S-RBL (Clariant, Huningue France), (Est) (a blue toner), or an Examples 7–14

Examples 7–14 were performed in the same manner as in Examples 1–6, except after feeding the monomer mixture into the esterification reactor, carboxyethylene phosphonic acid (CEPS) dissolved in warm ethylene glycol was added to the reaction mixture. Phosphoric acid, as an additional stabilizer, was added exclusively to Examples 11 and 12. In Examples 13 and 14, the residence time of the solid phase polycondensation amounted to 10 hours, instead of 8 hours as in the remaining Examples. The results are summarized in Table 2.

TABLE 2

| Example No. | 7 | 8 | 9 | 10 | 11 | 12 | 13 | 14 |
|---|---|---|---|---|---|---|---|---|
| Polyester after melt polycondensation | | | | | | | | |
| Co-monomer (weight %) | IPA 2.5 | CHDM 2.5 | NDA 2.5 | IPA 2.5 and PHB 2.0 | IPA 2.5 | IPA 2.5 | IPA 3.0 | IPA 3.0 |
| DEG (weight %) | 1.2 | 1.3 | 1.0 | 1.2 | 1.2 | 1.2 | 1.2 | 1.2 |
| Branching agent (ppm) | Penta 100 | PMS 100 | Penta 100 | — | Penta 100 | Penta 100 | — | — |
| CEPS (ppm P) | 127 | 127 | 254 | 254 | 127 | 127 | 302 | 151 |
| catalyst (ppm) | Sb 200 | Sb 180 | Sb 200 | Sb 200 | Ti 25 | Ge 60 | Sb 200 | Sb 200 |
| $H_3PO_4$ (ppm) | — | — | — | — | 20 | 20 | — | — |
| color toner (ppm) | Co 15 | Est 2 | Opt 10 | — | Co 15 | Co 15 | Co 10 | Co 10 |
| I.V. (dl/g) | 0.55 | 0.61 | 0.60 | 0.51 | 0.63 | 0.56 | 0.64 | 0.64 |
| Turbidity (NTU) | | | | | | 4.5 | 3 | 3 |
| Polyester after solid phase polycondensation | | | | | | | | |
| I.V. (dl/g) | 0.78 | 0.82 | 0.82 | 0.68 | 0.72 | 0.76 | 0.96 | 0.91 |
| Δ I.V. per hour | 0.029 | 0.026 | 0.028 | 0.021 | 0.012 | 0.025 | 0.032 | 0.027 |
| Turbidity (NTU) | | | | | | | 3.7 1.0 1.0 | |

While the present invention has been described by means of specific embodiments, it will be understood that modifications may be made without departing from the spirit of the invention. The scope of the invention is not considered to be limited by the description of the invention set forth in the specification and examples, but rather defined by the following claims.

We claim:

1. In a process for the acceleration of the polycondensation of polyester made by the esterification of at least one dicarboxylic acid with at least one diol, precondensation, melt phase polycondensation, granulation, crystallization and solid phase polycondensation, the improvement comprising the addition, prior to the precondensation reaction, of from about 30 to less than 500 ppm phosphorus in relation to the polyester in the form of carboxy phosphonic acid of the formula:

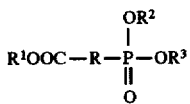

wherein, R is selected from the group consisting of $C_{1-10}$-alkylene, $C_{1-10}$-cycloalkylene, and $C_{6-10}$-arylene and $R^1$, $R^2$, and $R^3$ are independently selected from the group consisting of hydrogen, $C_{1-10}$-alkyl, $C_{1-10}$-cycloalkyl, and $C_{6-10}$-aryl, provided that at least two of $R^1$, $R^2$, and $R^3$ are hydrogen.

2. The process of claim 1, wherein the carboxy phosphonic acid compound is added when approximately 50 to 80% of the carboxyl groups of the dicarboxylic acid are esterified.

3. The process of claim 1, wherein the amount of carboxy phosphonic acid compound added is from about 60 to about 400 ppm phosphorus in relation to the polyester, wherein the polyester contains at least 95 wt. % ethylene terephthalate units.

4. The process of claim 1, wherein R is —$CH_2CH_2$—.

5. The process of claim 1, wherein the polyester is a polyethylene terephthalate containing up to about 10 weight % of a co-monomer.

6. The process of claim 1, wherein the polyester is a polyethylene terephthalate containing from about 0.8 to about 2.0 weight % of diethylene glycol, from about 0 to about 1000 ppm of pentaerythrite and from about 1.0 to about 5.0 weight % of a co-monomer selected from the group consisting of isophthalic acid, 2,6-napthalene dicarboxylic acid, p-hydroxy benzoic acid, and 1,4-cyclohexane dimethanol, all in relation to the polyester.

7. The process of claim 6, wherein the polyester is further processed into beverage bottles.

* * * * *